US009418255B2

United States Patent
Koike

(10) Patent No.: US 9,418,255 B2
(45) Date of Patent: Aug. 16, 2016

(54) MEDIA PROCESSING DEVICE, MEDIA PROCESSING SYSTEM, AND CONTROL METHOD OF A MEDIA PROCESSING DEVICE

(71) Applicant: Seiko Epson Corporation, Tokyo (JP)

(72) Inventor: Toshiaki Koike, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 13/845,294

(22) Filed: Mar. 18, 2013

(65) Prior Publication Data

US 2013/0285798 A1    Oct. 31, 2013

(30) Foreign Application Priority Data

Apr. 26, 2012  (JP) ................................ 2012-100776

(51) Int. Cl.
  *H04Q 5/22*    (2006.01)
  *G06K 7/10*    (2006.01)
  *G06K 17/00*   (2006.01)

(52) U.S. Cl.
  CPC ........ *G06K 7/10009* (2013.01); *G06K 17/0025* (2013.01)

(58) Field of Classification Search
  CPC .......... G06Q 20/341; G06Q 20/35765; G06Q 10/00; G06Q 10/087; G06Q 20/355; G06Q 20/3552; G06Q 20/3576; G06Q 20/4097; G06Q 30/06

USPC ................................................ 340/5.92, 10.1
See application file for complete search history.

(56) References Cited

U.S. PATENT DOCUMENTS

| | | | |
|---|---|---|---|
| 8,111,137 B2 | 2/2012 | Nagai et al. | |
| 2005/0035849 A1* | 2/2005 | Yizhack | ...................... 340/5.92 |
| 2009/0067910 A1* | 3/2009 | Sugiyama | ...................... 400/76 |
| 2010/0026463 A1 | 2/2010 | Ootaki et al. | |
| 2011/0298593 A1* | 12/2011 | Sugiyama | .................. 340/10.51 |
| 2012/0098642 A1* | 4/2012 | Krawczewicz | .. G06K 19/07707 340/10.1 |

FOREIGN PATENT DOCUMENTS

| | | |
|---|---|---|
| JP | 2005-182672 | 7/2005 |
| JP | 2009-015513 | 1/2009 |
| JP | 2009-083459 | 4/2009 |
| WO | 2008081551 A1 | 7/2008 |

* cited by examiner

*Primary Examiner* — Fekadeselassie Girma
*Assistant Examiner* — Thomas McCormack

(57) ABSTRACT

Overwriting information that was correctly written to an IC tag that can communicate wirelessly but is not the IC tag on the medium intended to be processed is prevented so that the wrong information is not stored in the IC tag. When writing write data including uniquely assigned tag ID information to an IC tag ends correctly, the system controller 35 of the media processing device 2 stores information indicating that writing the IC tag was completed. When writing write data to an IC tag, the system controller 35 reads the tag ID information and determines if information matching the read tag ID information is included in the stored tag ID information. If matching information is found, the system controller 35 prohibits writing to the IC tag.

10 Claims, 5 Drawing Sheets

MEDIA PROCESSING DEVICE, MEDIA PROCESSING SYSTEM, AND CONTROL METHOD OF A MEDIA PROCESSING DEVICE

This application claims priority under 35 U.S.C. §119 to Japanese Patent Application No. 2012-100776 filed on Apr. 26, 2012, the entire disclosure of which is expressly incorporated by reference herein.

BACKGROUND

1. Technical Field

The present invention relates to a media processing device that can write information to an integrated circuit tag (IC tag) disposed to a medium, to a media processing system, and to a control method of the media processing device.

2. Related Art

Media processing devices (such as recording devices and label printers) that can write information by near-field communication to IC tags (such as electronic tags and RFID (radio frequency identification) tags) that can communicate contactlessly and are embedded in a medium (such as a recording medium or label) are known from the literature. See, for example, Japanese Unexamined Patent Appl. Pub. JP-A-2009-83459.

Media having information written to an IC tag are used in various ways. For example, when a customer checks a bag at the service counter of an airport, information identifying the flight on which the baggage is to be loaded may be written to an IC tag embedded in the baggage ticket media, and the baggage ticket then affixed adhesively or by other means to the baggage. When the baggage is then loaded on the plane, the information in the IC tag of the baggage ticket affixed to the luggage is read to identify the plane on which the luggage should be loaded.

When information (write data) is written to the IC tag of the media by this media processing device, the media processing device may communicate wirelessly with the IC tag of an unintended medium because other unintended media is physically near the intended medium (the medium having the IC tag to which the data is to be written). Data may therefore be written to the IC tag of an unintended medium. As a result, the data in an IC tag that was already written correctly by the media processing device may be overwritten by other information, and data may not be written to the intended IC tag.

When information written to the IC tag of the medium is used to identify the item to which the media is attached, the identification must be reliable. The information written to the IC tag must therefore be reliable (accurate). However, if the IC tag on an unintended medium to which data was already written correctly is overwritten with other information, the medium with the IC tag to which data was mistakenly written will be attached to the baggage. Writing the wrong information to an IC tag to which data was already written correctly must therefore be prevented.

SUMMARY

An object of the present invention is to prevent information written correctly to the IC tag of a medium not intended to be processed from being overwritten with wrong information.

One aspect of the invention is a media processing device including a data read/write unit that writes and reads information (write data) including identification information (tag identification information) in an IC tag embedded in a medium by wireless communication; a memory unit that stores at least the identification information written to the IC tag by the data read/write unit; and a control unit that controls the data read/write unit and the memory unit, stores at least the identification information contained in the written information to the memory unit when writing the information to the IC tag by the data read/write unit ends, determines when writing the information to the IC tag by the data read/write unit if the identification information read by the data read/write unit from the IC tag that can communicate wirelessly matches identification information stored in the memory unit, and if the identification information read from the IC tag matches identification information stored in the memory unit, prohibits writing the information to the IC tag from which the data read/write unit read the identification information.

This aspect of the invention manages IC tags that were previously written by centrally storing tag ID information. To write the write data to the IC tag of one medium that can communicate wirelessly with the data read/write unit, the tag ID information of that IC tag is first read from the memory unit, and the centrally stored tag ID information is searched to determine if there is a match with the tag ID information read from the IC tag. Finding a match means that tag ID information was already written in the past to the IC tag that is about to be written, in other words, that the media processing device is attempting to write the write data to the IC tag of another medium that is not intended for processing. In this situation, overwriting the information already written to the IC tag of that other medium must be prevented. This aspect of the invention therefore prohibits writing the write data when matching tag ID information is found so that data is not overwritten. Overwriting the IC tag of a different medium that is not intended for processing and to which write data was already written correctly with different write data, and storing incorrect information to that unintended IC tag, can therefore be prevented.

A media processing device according to another aspect of the invention also has a recording unit that records on the medium; and first recording information stored in the memory unit. The control unit determines when writing the information to the IC tag of the medium by the data read/write unit if the identification information read by the data read/write unit from the IC tag that can communicate wirelessly matches identification information stored in the memory unit; and if the identification information read from the IC tag does not match identification information stored in the memory unit, and other information is already written in the IC tag, reads the first recording information from the memory unit, and records the first recording information on the medium by the recording unit.

If information identical to the tag ID information read from the IC tag of one medium that is communicating wirelessly and is about to be written is not found in the centrally stored tag ID information, and write data was already written to that IC tag, the write data was not written correctly as expected by the media processing device to the IC tag of that one medium, and the reliability of the write data written to that IC tag cannot be assured. This can happen due to corruption of the specific default value or write data stored in the IC tag, part of the IC tag being broken, or the IC tag having been already written by another media processing device. Because first recording information indicating an error, for example, is printed on the medium in this situation, the user can be quickly informed that there is a problem with the IC tag of the medium. The user can also know that the write data written to the IC tag of the medium may be incorrect, and can take appropriate action.

In another aspect of the invention, the media processing device also has a recording unit that records on the medium; and second recording information stored in the memory unit. The control unit determines when writing the information to the IC tag of the medium by the data read/write unit if the identification information read by the data read/write unit from the IC tag that can communicate wirelessly matches identification information stored in the memory unit; and if the identification information read from the IC tag matches identification information stored in the memory unit, reads the second recording information from the memory unit, and records the second recording information on the medium by the recording unit.

Because this aspect of the invention records the second recording information indicating an error, for example, on the medium when matching tag ID information is found, the user can know that write data was already correctly written by a media processing device to the IC tag that is communicating wirelessly and is about to be written. In this situation a medium that was correctly written and produced may have been placed near the media processing device and happens to be communicating wirelessly with the media processing device. Alternatively, the same tag ID information may have already been written to that IC tag by another media processing device. The user can therefore know that the media processing device, or another media processing device, has made a mistake, and can take appropriate action.

In a media processing device according to another aspect of the invention, the control unit determines when writing the information to the IC tag by the data read/write unit if a specific default value is written, or the identification information is written by the data read/write unit, in the IC tag that can communicate wirelessly; and if the identification information is not written, or the specific default value is written, in the IC tag, writes the information the IC tag that can communicate wirelessly by the data read/write unit.

This aspect of the invention can determine that identification information has not been written to the IC tag that is communicating wirelessly with the media processing device, and can therefore correctly write the identification information because the IC tag is on the medium intended for processing.

A media processing device according to another aspect of the invention also has a recording unit that records on the medium; and the control unit records at least the identification information on the medium by the recording unit if the identification information is not written, or the specific default value is written, in the IC tag that can communicate wirelessly.

This aspect of the invention can determine that identification information has not been written to the IC tag that is communicating wirelessly with the media processing device, and can therefore correctly record identification information on the medium because the IC tag is on the medium intended for processing.

Another aspect of the invention is a media processing system including: a plurality of media processing devices; and a control device connected to the plural media processing devices. The media processing device includes a data read/write unit that writes and reads information including identification information in an IC tag embedded in a medium by wireless communication; and a control unit that controls the data read/write unit and the memory unit, communicates with the control device and stores at least the identification information contained in the written information to a memory unit of the control device when writing the information to the IC tag by the data read/write unit ends, communicates with the control device and determines if the identification information read by the data read/write unit from the IC tag that can communicate wirelessly matches identification information stored in the memory unit of the control device when writing the information to the IC tag by the data read/write unit, and if the identification information read from the IC tag matches identification information stored in the memory unit, prohibits writing the information to the IC tag from which the data read/write unit read the identification information.

This aspect of the invention can prevent overwriting information that was correctly written to the IC tag of a medium that can communicate wirelessly with the data read/write unit but is not the medium intended to be processed, and prevent storing incorrect information in the IC tag. However, there are also systems in which each of plural media processing devices write data to the IC tags of media. To prevent all of the media processing devices in such a system from overwriting information (write data) that was correctly written to the IC tag of unintended media that can communicate wirelessly with the data read/write units of the plural media processing devices, the tag ID information (identification information) of the IC tags to which each of the media processing devices wrote write data must be managed system-wide. This aspect of the invention therefore uses the memory unit of the control device to centrally manage tag identification information for the IC tags to which write data was written correctly by any of the media processing devices in the system, and each of the media processing devices determines if data was already written to a particular IC tag based on the tag ID information centrally managed by the control device. As a result, all of the media processing devices in the system can be reliably prevented from overwriting information that was correctly written to the IC tag of a medium that is not intended for processing but which can communicate wirelessly.

In a media processing system according to another aspect of the invention, the media processing device also includes a recording unit that records on the medium, and a memory unit that stores specific recording information. The control unit communicates with the control device and determines if the identification information read by the data read/write unit from the IC tag that can communicate wirelessly matches identification information stored in the memory unit of the control device when writing the information to the IC tag of the medium; and if the identification information read from the IC tag does not match identification information stored in the memory unit, and other information is already written in the IC tag, reads the specific recording information from the memory unit, and records the specific recording information on the medium by the recording unit.

By recording information indicating an error, for example, when identification information that does not match is found in the centrally stored identification information in the memory unit of the control device, and other information was already written in the IC tag, the user can know there is a problem with the IC tag of the medium being processed. The user can also know that the write data stored in the IC tag of the medium being processed may be incorrect, and can take appropriate action.

Another aspect of the invention is a control method of a media processing device having a data read/write unit that writes and reads information including identification information in an IC tag embedded in a medium by wireless communication, a memory unit that stores at least the identification information written to the IC tag by the data read/write unit, the control method including: storing at least the identification information contained in the written information to the memory unit when writing the information to the IC tag by the data read/write unit ends, determining if the tag identification information read by the data read/write unit from the IC tag that can communicate wirelessly matches identification information stored in the memory unit when writing the information to the IC tag by the data read/write unit, and if the identification information read from the IC tag matches identification information stored in the memory unit, prohibiting writing the information to the IC tag from which the data read/write unit read the identification information.

The control method according to another aspect of the invention can prevent overwriting information that was correctly written to the IC tag of a medium communicating wirelessly with the media processing device but not intended for processing, and can prevent storing incorrect information to the IC tag.

Effect of the Invention

The invention prevents overwriting information written to an IC tag that can communicate wirelessly but is not on the medium intended to be processed.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
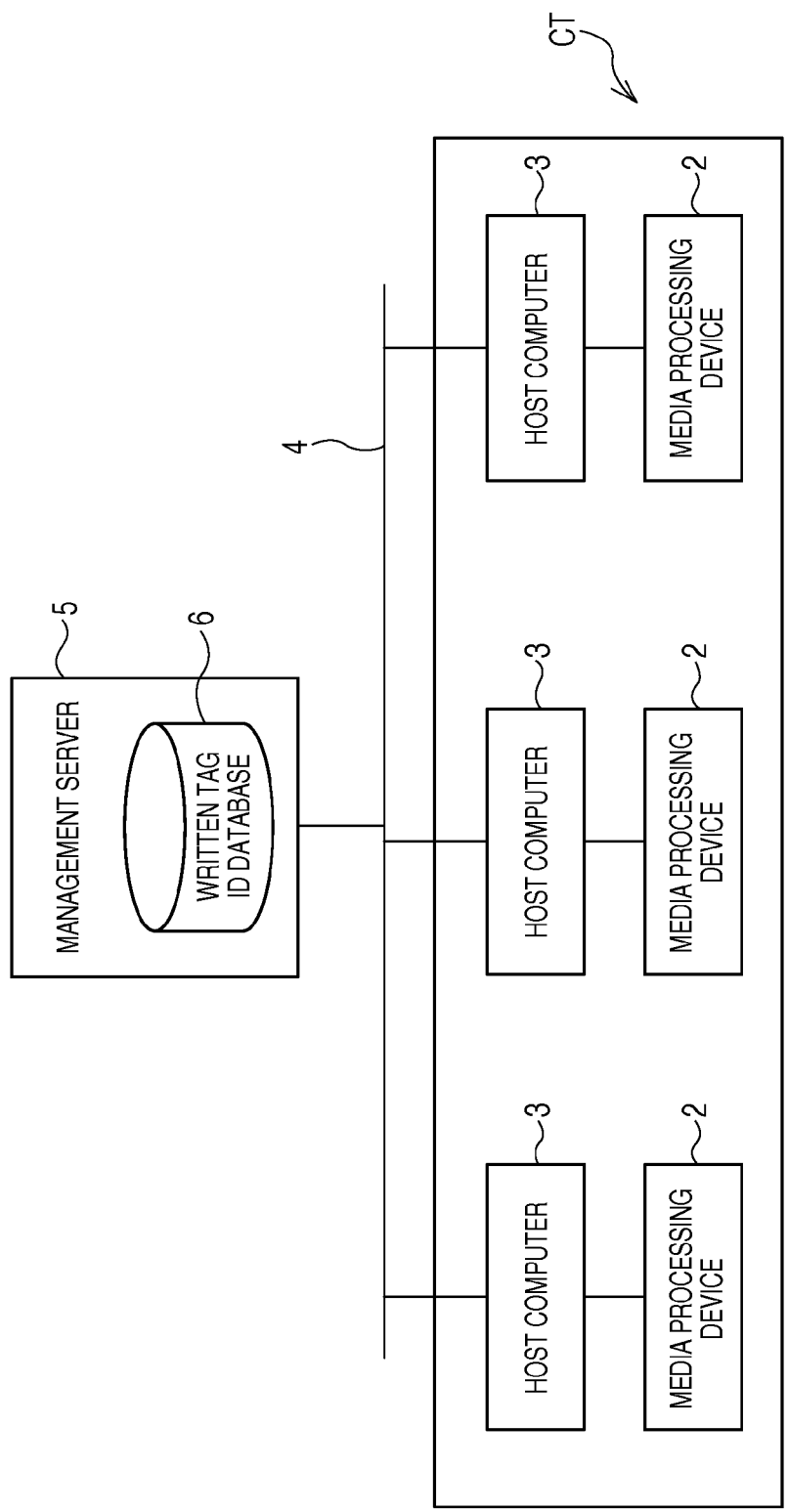
FIG. 1 describes the configuration of a media processing system according to a preferred embodiment of the invention.

FIG. 1 shows the configuration of a media processing system 1 according to a preferred embodiment of the invention.

The media processing system 1 in this embodiment of the invention is used at a service counter CT operated by an airline company in an airport. A function of the media processing system 1 is to produce labels ("baggage tags" below) with information identifying the flight of the airplane on which the baggage should be loaded recorded on the recording surface and written to an embedded RFID tag 11 (IC tag) on the baggage tag when baggage to be loaded on a flight is received from a customer checking in for the flight at the service counter CT. The baggage tag is then attached with adhesive or other means to the baggage. When the baggage is then loaded on the plane, the flight of the airplane on which baggage should be loaded is identified by reading the information written to the RFID tag 11 of the baggage tag attached to the baggage using a dedicated reader, for example, so that the baggage is loaded on the correct flight.

As shown in FIG. 1, the media processing system 1 includes a plurality of media processing devices 2 that produce baggage tags, a plurality of host computers 3 respectively controlling the media processing devices 2, and a management server 5 (control device) connected to communicate with the host computers 3 over a LAN or other network 4.

The media processing system 1 has a plurality of media processing devices 2, and each media processing device 2 can produce baggage tags.

Figure 2:
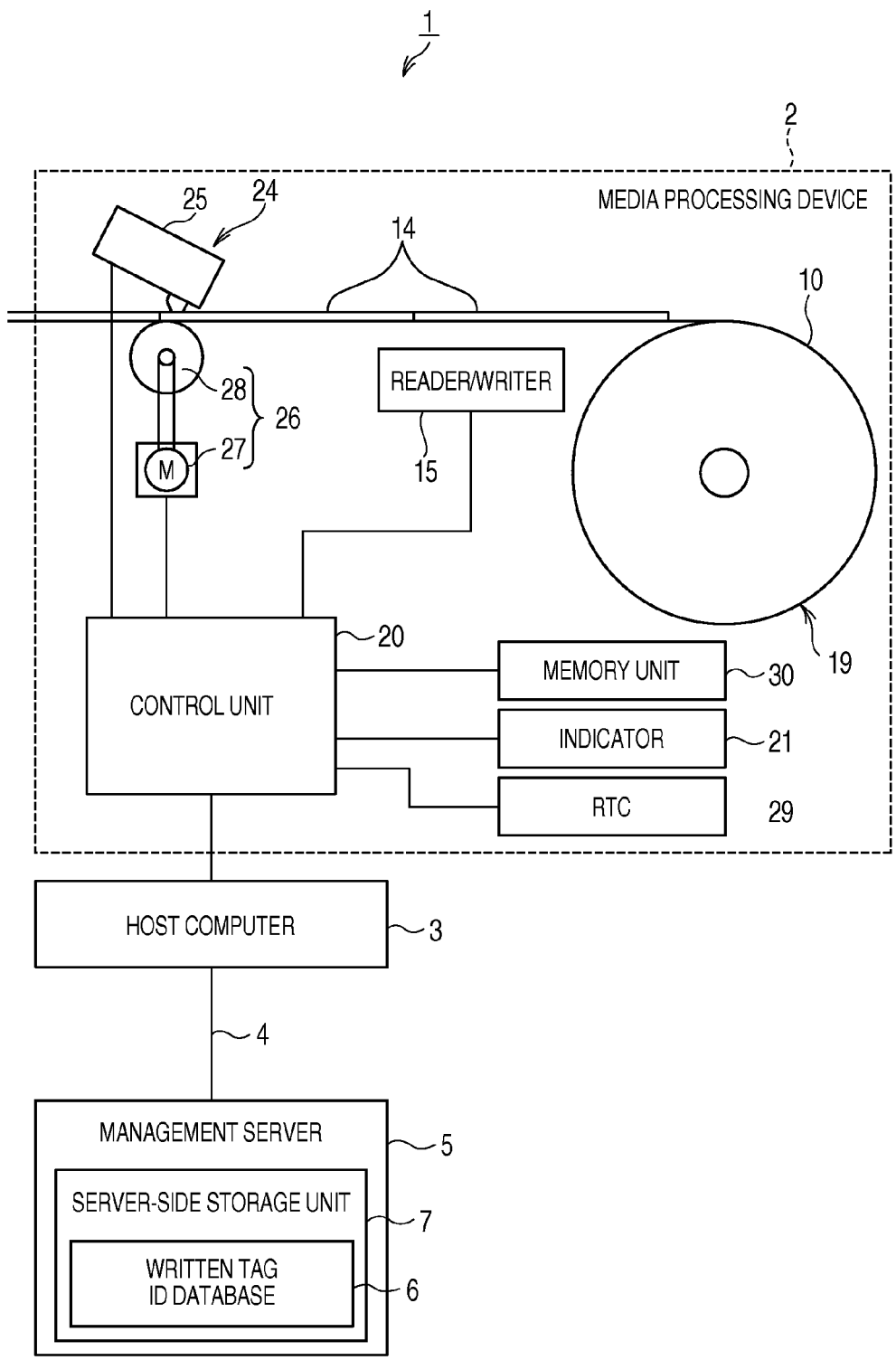
FIG. 2 shows the configuration of the media processing system in detail.
Figure 3:
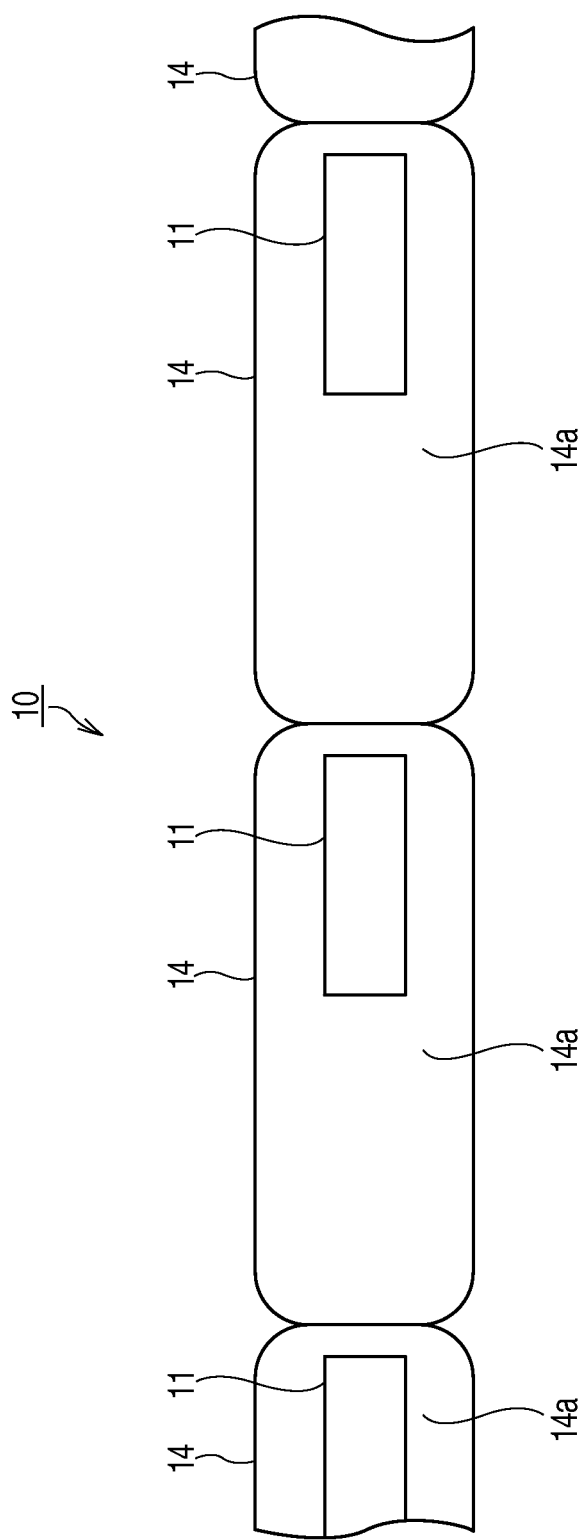
FIG. 3 is an example of special media.

FIG. 2 shows the configuration of media processing system 1 in more detail. FIG. 3 shows an example of special paper 10 (medium) that is processed by the media processing device 2.

As shown in FIG. 3, the special paper 10 has plural label blocks 14 connected in a continuous series in a specific direction. One label block 14 corresponds to one baggage tag, and one baggage tag is produced by recording a specific image on the recording surface 14a of one label block 14, writing specific information to the RFID tag 11 of that one label block 14, and then cutting the one label block 14 from the special paper 10.

A RFID tag 11 is disposed to each label block 14 at a specific position. The RFID tag 11 is a tag that can communicate contactlessly, and communicates with the reader/writer 15 of the media processing device 2 described below by near-field wireless communication based on a specific standard such as the NFC protocol. Each RFID tag 11 has an antenna and an IC chip, and the IC chip includes a control circuit, RF unit, signal processor that functions as a modem unit, and rewritable semiconductor memory that stores data nonvolatilely.

As shown in FIG. 2, the media processing device 2 has a storage unit 19 that stores special paper 10 in a roll. The media processing device 2 executes a suitable process on each of the label blocks 14 in the special paper 10 while conveying the special paper 10 stored in the storage unit 19 in a specific direction.

The control unit 20 includes a CPU, RAM, ROM, and other peripheral circuits, and centrally controls other parts of the media processing device 2. More specifically, a control program that controls the basic operation of the media processing device 2 is stored in ROM, and the CPU of the control unit 20 controls other parts of the media processing device 2 by reading and executing the control program from ROM.

The indicator 21 includes a plurality of LEDs, and displays information such as the operating mode of the media processing device 2 and error reports by turning the LEDs on and off, and changing the display color of the LEDs when on, in various combinations.

The reader/writer 15 includes an antenna, RF unit, and signal processor that functions as a modem, communicates with the RFID tag 11 disposed to a label block 14 of the special paper 10 by near-field communication according to a specific standard or based on a specific standard, writes information to a specific address in the semiconductor memory of the RFID tag 11, and reads information stored in the semiconductor memory of the RFID tag 11. Writing information to a specific address in the semiconductor memory of the RFID tag 11 is referred to below as simply "writing information to the RFID tag 11," and reading information stored in the semiconductor memory of the RFID tag 11 is referred to as simply "reading information from the RFID tag 11." The reader/writer 15 works with other parts and devices in this embodiment to function as a data read/write unit that writes information to or read information from the IC tag of the media by wireless communication.

The recording mechanism 24 is a mechanism that records an image on the recording surface 14a of a label block 14 of the special paper 10, and includes a recording head 25. The recording head 25 is a line thermal head having heat elements arrayed in a direction crossing the conveyance direction of the special paper 10, and records images using the combination of dots formed by applying heat to the recording surface 14a of the label block 14 of the special paper 10. In this embodiment the recording mechanism 24 works with other parts and devices to function as a recording unit that records on the media.

The conveyance mechanism 26 includes a conveyance motor 27 and a platen roller 28 connected to the conveyance motor 27, turns the platen roller 28 in a specific direction by driving the conveyance motor 27, and conveys the special paper 10 in the conveyance direction by rotation of the platen roller 28.

The RTC 29 (real-time clock) keeps the current date and time (date and time) using power supplied from a battery not shown, and outputs data indicating the current date and time to the control unit 20.

The host computer 3 is a terminal that controls the media processing device 2, has a device driver for controlling the media processing device 2 installed, sends control commands as needed to the media processing device 2, and controls the media processing device 2 using functions of the device driver.

The management server 5 is a server that centrally manages the media processing system 1, and stores a written tag ID database 6 described below on a server-side storage unit 7.

Note that when the reader/writer 15 finishes reading tag identification information ("tag ID information" below) from and writing specific information to the RFID tag 11 of the intended label block 14, the tag ID information could be written to a media processing device-side memory unit 30 instead of the written tag ID database 6.

Figure 4:
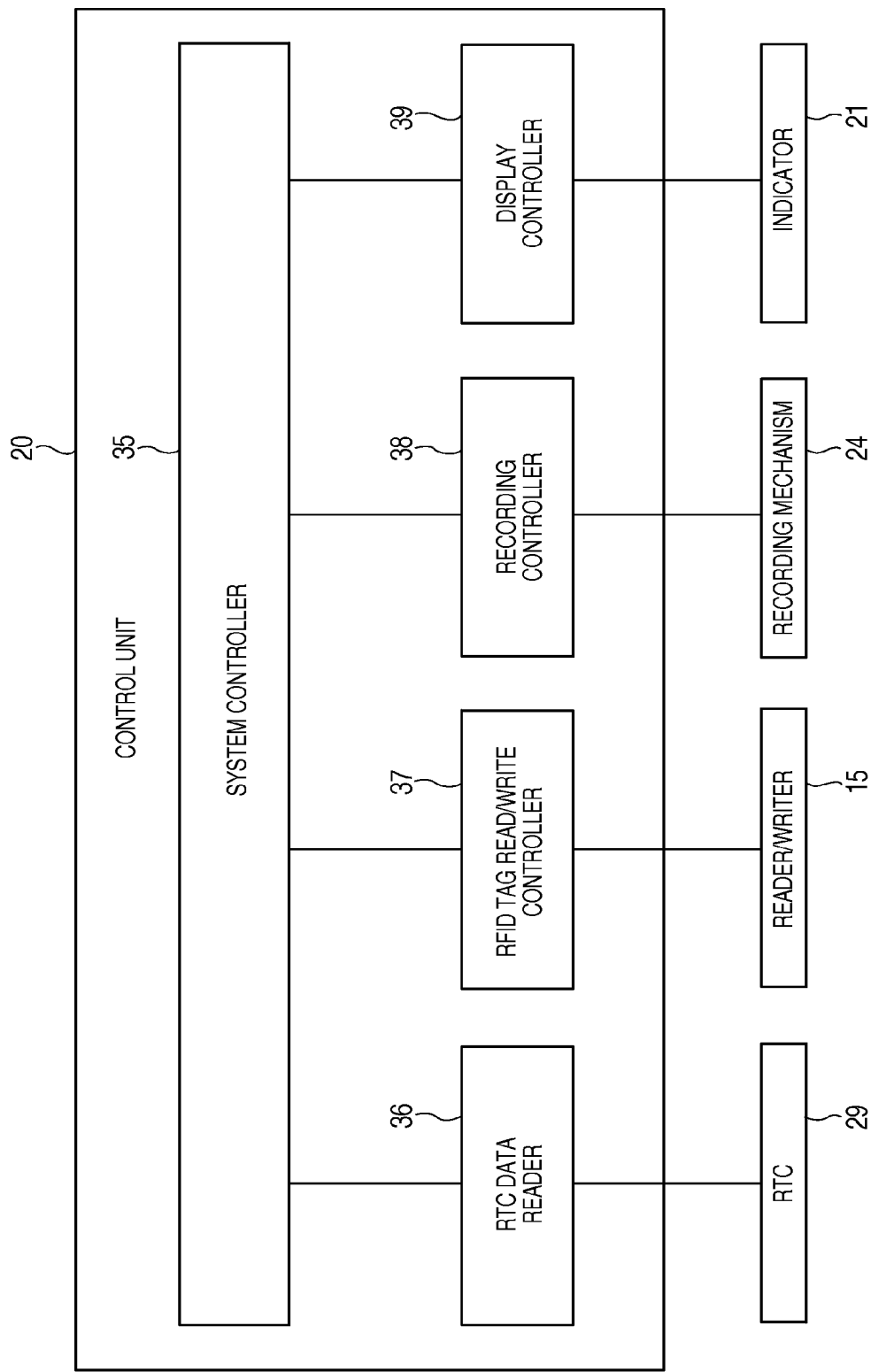
FIG. 4 is a block diagram showing the functional configuration of a media processing device.

FIG. 4 shows the function blocks of the main functions of the control unit 20. The functions of the function blocks shown in FIG. 3 are achieved by the cooperation of hardware and software, such as the CPU of the control unit 20 reading and executing a basic control program stored in ROM.

A system controller 35 centrally controls an RTC data reader 36, an RFID tag read/write controller 37, a recording controller 38, and a display controller 39.

The RTC data reader 36 accesses volatile memory in which data indicating the current time of the RTC 29 is stored, gets data indicating the current time stored in the memory, and outputs the time information to the system controller 35.

The RFID tag read/write controller 37 controls the reader/writer 15 as controlled by the system controller 35, and writes information to the RFID tag 11 of the label block 14 of the special paper 10, or reads information from the RFID tag 11.

The recording controller 38 controls the recording mechanism 24, and records an image on the recording surface 14a of a label block 14 of the special paper 10, as controlled by the system controller 35.

The display controller 39 outputs drive signals through the signal processor to the LEDs of the indicator 21 and causes the LEDs to turn on or off in specific ways as controlled by the system controller 35.

As described above using FIG. 3, the special paper 10 has label blocks 14 connected continuously one after the other. As a result, in a series of one label block 14 and label blocks 14 proximal to the one label block 14, the RFID tags 11 disposed to each of the label blocks 14 are physically close to each other. Because this creates circumstances in which the reader/writer 15 can communicate wirelessly with the RFID tag 11 of an unintended label block 14 (a label block 14 other than the label block 14 that should be processed), the following problems can occur.

After writing write data D2 to the RFID tag 11 of one label block 14 is successfully completed, write data D2 may then be written to the RFID tag 11 of the next label block 14 adjacent to the one label block 14. Because the next label block 14 to be processed and the label block 14 to which writing has already been completed are physically close together, the reader/writer 15 could establish communication with the one label block 14 to which writing is already completed, and write data to the RFID tag 11 of the one label block 14 instead of the next intended label block 14. When this happens, the original data that was successfully written to the one label block 14 can be overwritten with the data intended for the next label block 14.

If a completed label block 14 to which data was successfully written to the RFID tag 11 is placed close to the media processing device 2, there are also situations in which the reader/writer 15 might communicate wirelessly with the RFID tag 11 of the completed label block 14. The same thing can happen if write data D2 has already been mistakenly written to a RFID tag 11 by another media processing device 2, and the label block 14 having that RFID tag 11 is set in the media processing device 2 or is placed near the media processing device 2.

The following problems can also occur.

If tag ID information read from a RFID tag 11 that can communicate wirelessly with the reader/writer 15 differs from past tag ID information stored in the memory unit 30 of the media processing device 2, that tag ID information may have already been written by another media processing device 2. If the read tag ID information differs from the value written as the default value to the RFID tag 11, a malfunction may have occurred. Note that the default value of the RFID tag 11 is previously stored in the memory unit 30 for comparison. There are thus various situations in which data, including a default value, is not written normally as expected for some reason. Because the reliability of the information written to the RFID tag 11 cannot be assured in such situations, the user must be made aware that the data is not reliable.

The components of the media processing system 1 according to this embodiment of the invention therefore operate as follows to resolve this problem.

Figure 5:
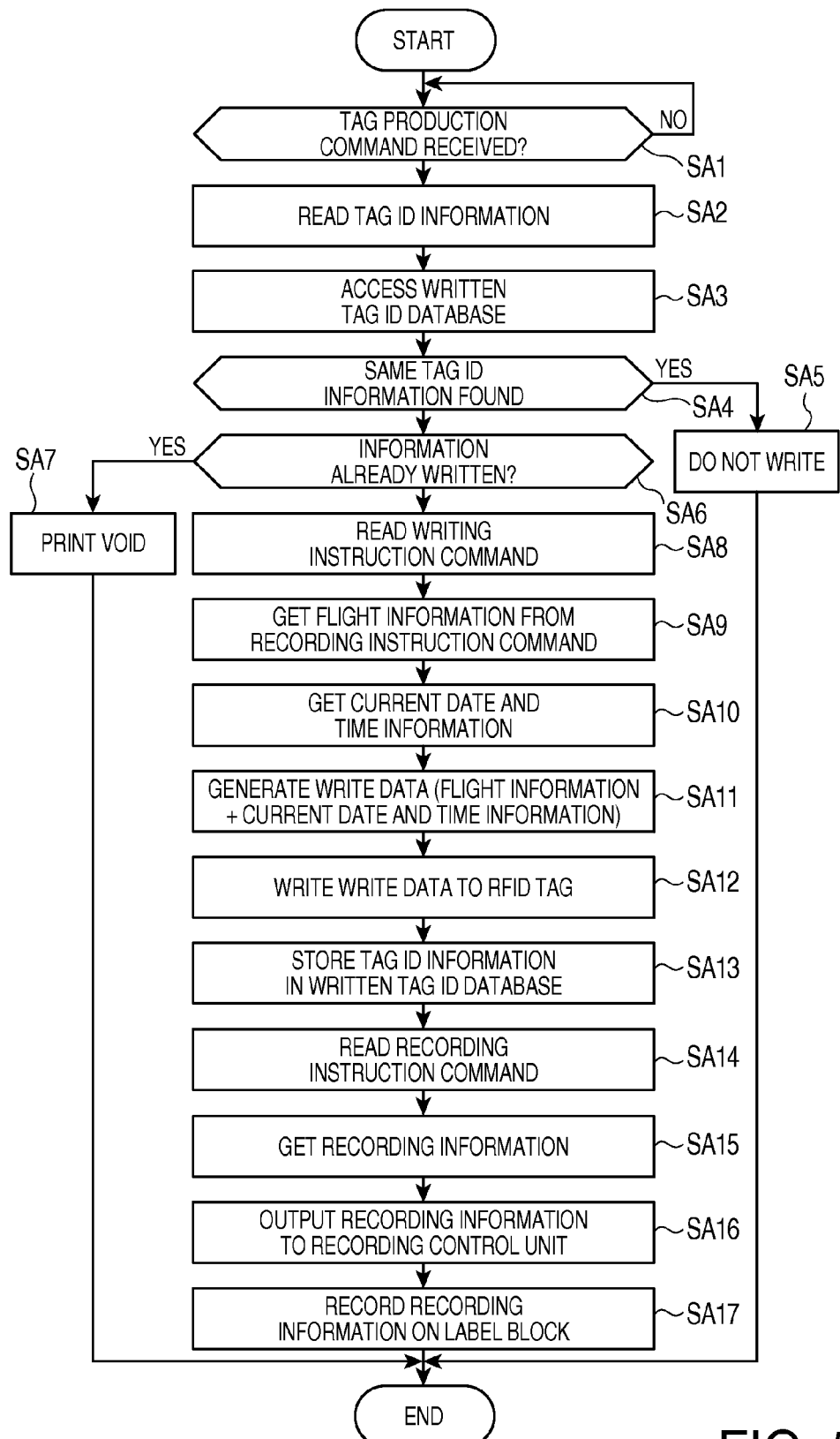
FIG. 5 is a flow chart of the operation of the media processing device.

FIG. 5 is a flow chart of media processing device 2 operation when producing a baggage tag. Note that the special paper 10 is conveyed desirably below, and further description of the conveyance method is omitted.

The system controller 35 of the control unit 20 of the media processing device 2 first checks if a control command (tag production command) for producing a baggage tag was received from the host computer 3 (step SA1).

This tag production command is described in detail below.

As described above, when a bag is checked by a customer, a tag is produced with information identifying the flight on which the bag should be loaded recorded on the recording surface of the baggage tag and written to the RFID tag 11. To produce a baggage tag, the host computer 3 generates and sends a tag production command including a recording instruction command C1 and a writing instruction command C2 to the media processing device 2.

The recording instruction command C1 is a control command that contains recording information D1 and instructs recording the recording information D1 on the recording surface 14a of the label block 14 to be issued as a baggage tag. In this embodiment the recording information D1 includes (1) information about the customer, such as the customer name (customer information); (2) information identifying the flight on which the bag should be loaded (flight information); and (3) a barcode identifying the flight on which the bag should be loaded (barcode information). By recording recording information D1 including the customer information, flight information, and barcode information on the recording surface of the baggage tag, the flight on which the bag to which the baggage tag is attached should be loaded can be identified by reading the recording information D1 or scanning the barcode information with a barcode reader. The information contained in the recording information D1 is not limited to the foregoing, and information other than the three types described above can be included.

The writing instruction command C2 is a control command that instructs writing write data D2 to the RFID tag 11. This write data D2 includes the flight information and customer information contained in the foregoing recording information D1, and current date and time information (time-related information, referred to below as "current date and time information"). The particular flight on which the bag should be loaded can be uniquely identified by using at least two of this flight information, customer information, and current date and time information. When baggage is sorted according to the actual flights on which bags should be loaded, the write data D2 is read from the RFID tag 11 by an RFID tag 11 reader not shown, and the flight on which a bag should be loaded can be identified based on the write data D2 that was read.

In this embodiment the current date and time information includes both the date (year, month, day) and time (hour and minute), but other information, such as the month and day, could be used instead if the information can uniquely identify the particular flight. The flight can also be identified from the customer information. The flight information is used for example below.

When a tag production command is received (step SA1 returns YES), the system controller 35 can communicate wirelessly with the reader/writer 15, and reads the tag ID information from the RFID tag 11 of the label block 14 that should normally be processed (the label block 14 for the baggage tag that should be produced; referred to below as the "intended label block 14") (step SA2). In preparation for recording by the recording mechanism 24 and reading/writing by the reader/writer 15, the intended label block 14 is conveyed to a position near the recording mechanism 24 and reader/writer 15.

Next, the system controller 35 accesses the written tag ID database 6 stored in the server-side storage unit 7 of the management server 5 through the host computer 3 (step SA3). The system controller 35 accesses the written tag ID database 6 by communicating with the management server 5 through the host computer 3 according to or based on a specific protocol.

Next, the system controller 35 determines if tag ID information of the same value as the value of the tag ID information read in step SA2 is stored in the written tag ID database 6 (step SA4). The process of making this decision can be performed by a function of the system controller 35 or a function of the management server 5.

As will be understood from step SA13 described below, tag ID information for the RFID tags 11 to which the write data D2 was successfully written in the past based on a tag production command is centrally stored in the written tag ID database 6. More specifically, write data D2 has already been successfully written to the RFID tags 11 identified by the tag ID information stored in the written tag ID database 6.

Alternatively, information of the same content as the information stored in the written tag ID database 6 could be stored in the memory unit 30, and the memory unit 30 referenced instead of accessing the written tag ID database 6 to determine if the tag ID information read from the RFID tag 11 is stored in the memory unit 30.

If it is determined in step SA4 that tag ID information of the same value as the value of the tag ID information read in step SA2 is stored in the written tag ID database 6 (step SA4 returns YES), the system controller 35 can communicate wirelessly with the reader/writer 15 but determines the RFID tag 11 does not belong to the intended label block 14 and therefore prohibits writing and does not write the write data D2 to that RFID tag 11, and prohibits recording and does not record the recording information D1 to the intended label block 14 now at the recording mechanism 24 (step SA5).

The effect of this step SA5 is described below.

As described above, that tag ID information of the same value as the value of the tag ID information read in step SA2 is stored in the written tag ID database 6 means that the label block 14 bearing the RFID tag 11 that is communicating wirelessly and about to be written is not actually the intended label block 14, and writing write data D2 to the RFID tag 11 of that label block 14 has already been successfully completed. This can happen when attempting to write write data D2 again to the RFID tag 11 of the label block 14 to which write data D2 was just written, or when a completed baggage tag to which write data D2 was successfully written to the RFID tag 11 is placed near the media processing device 2, and the media processing device 2 communicates with the RFID tag 11 of that label block 14. If the information already stored in the RFID tag 11 is overwritten, the information stored in the RFID tag 11 will be wrong.

If tag ID information of the same value as the value of the tag ID information read in step SA2 is stored in the written tag ID database 6, this embodiment of the invention therefore prohibits and does not write write data D2 to a label block 14 that is not the intended label block but is being addressed for writing. An RFID tag 11 to which write data D2 has already been successfully written can therefore be prevented from being written again with the wrong information. More specifically, by storing tag ID information for RFID tags 11 in memory unit 30 or in the written tag ID database 6, the media processing system 1 according to this embodiment of the invention uses this tag ID information to effectively prevent mistakenly overwriting write data D2 that was correctly written to the RFID tag 11.

The write data D2 is also not written to the RFID tag 11 of the intended label block 14. To report this to the user, the recording controller 38 does not record the recording information D1 on the intended label block 14 in step SA5, but the recording mechanism 24 could alternatively print VOID or an error message, for example. The VOID or error information (second recording information, information related to the image recorded by VOID or error printing) is previously stored in the memory unit 30, and read and printed by the recording controller 38 controlling the recording mechanism 24. By thus determining that writing was already completed normally to an unintended label block 14 which is communicating wirelessly with the media processing device 2 and is about to be written, an error message reporting that information was not written and was not recorded on the intended label block 14 can be printed to inform the user. In addition, when a label block 14 that is not intended for processing has an RFID tag 11 storing the same tag ID value as the intended label block 14 has been processed but not yet discharged from the media processing device 2, the recording controller 38 could reverse the label block 14 not intended for processing to the recording mechanism 24 by the conveyance mechanism 26, and print VOID or an error message about possible overwriting to inform the user. In this way, VOID or an error can be printed on at least one of a group of plural RFID tag 11 label blocks 14 each having an RFID tag 11 with the same tag ID as the RFID tag 11 that should be processed.

If it is determined in step SA4 that tag ID information of the same value as the value of the tag ID information read in step SA2 is not stored in the written tag ID database 6 (step SA4 returns NO), the system controller 35 accesses a specific address in the semiconductor memory of the RFID tag 11 with the RFID tag read/write controller 37, and determines if data was previously written to the RFID tag 11 (step SA6).

If data was already written (step SA6 returns YES), the system controller 35 prints VOID or an error on the intended label block 14 through the recording controller 38 (step SA7). Printing VOID refers to printing an image obviously indicating that the label block 14 is void (cannot be used) on the recording surface 14a of the label block 14. By reading the image recorded by the VOID or error printing step, the user can quickly and reliably know that the label block 14 or the baggage tag corresponding to the label block 14 is void or wrong. Recording information for VOID or error printing (first recording information, information related to the image recorded by VOID or error printing) is stored in the memory unit 30.

The effect of step SA7 is described below.

As will be understood from step SA13 described below, when writing write data D2 to the RFID tag 11 is completed correctly, the system controller 35 stores tag ID information for the RFID tag 11 to the memory unit 30 and sends the tag ID information to the management server 5 where tag ID information is managed in the written tag ID database 6. Therefore, if the tag ID information read from the RFID tag 11 that is communicating wirelessly and is about to be written is not stored in the written tag ID database 6 or memory unit 30, and information has already been written to the RFID tag 11, the media processing device 2 may not be writing information correctly as expected for some reason. These reasons include corruption of the specific default value or tag ID information that was written to the RFID tag 11 being read, part of the RFID tag 11 being broken, or the RFID tag 11 having been already written by another media processing device 2. Because writing the write data D2 and recording the recording information D1 are prohibited and not done in this situation, and VOID or an error is printed on the intended label block 14, the user can be quickly informed that incorrect information was written to the label block 14 or the label block 14 is no good, and prompted to take corrective action.

If it is determined in step SA6 that information has not been written to the RFID tag 11, and the specific default value is written, (step SA6 returns NO), the system controller 35 can determine that the label block 14 bearing the RFID tag 11 that is communicating wirelessly and about to be written is the label block 14 intended for processing, and therefore reads the writing instruction command C2 contained in the tag production command (step SA8). The next steps SA9 to SA12 are executed by the system controller 35 reading and executing the writing instruction command C2. The specific default value is stored in the memory unit 30, and can be read and compared by the system controller 35.

The system controller 35 then acquires the flight information from the recording information D1 contained in the recording instruction command C1 of the tag production command (step SA9).

Next, the system controller 35 gets the data indicating the current time stored in volatile memory in the RTC 29 from the RTC information reader 36, and gets the current date and time information (step SA10).

Next, the system controller 35 generates write data D2 combining the flight information acquired in step SA3 and the current date and time information acquired in step SA4 (step SA11), and controls the RFID tag read/write controller 37 to write the write data D2 to the RFID tag 11 through the reader/writer 15 (step SA12).

Next, the system controller 35 communicates through the host computer 3 with the management server 5, and requests the management server 5 to store the tag ID information read in step SA2 in the written tag ID database 6 (step SA13). In response to this request, the management server 5 stores the tag ID information in a suitable form to the written tag ID database 6. The tag ID information can also be stored in the memory unit 30.

The system controller 35 in this embodiment of the invention thus stores the tag ID information for each RFID tag 11 to which write data D2 has been successfully written in the written tag ID database 6. As a result, tag ID information for each RFID tag 11 to which write data D2 has been successfully written can be centrally managed in the written tag ID database 6.

While the media processing system 1 according to this embodiment of the invention has plural media processing devices 2, an RFID tag 11 to which one media processing device 2 wrote write data D2 can be reliably prevented from being overwritten with information by another media processing device 2, for example, because tag ID information for the RFID tags 11 to which data has been written by each of the plural media processing devices 2 is centrally managed in the written tag ID database 6.

Next, the system controller 35 reads the recording instruction command C1 contained in the tag production command (step SA14). The following steps SA15 to SA17 are performed by the system controller 35 reading and executing the recording instruction command C1.

Next, the system controller 35 gets the recording information D1 contained in the recording instruction command C1 (step SA15), and outputs to the recording controller 38 (step SA16). Based on the input recording information D1, the recording controller 38 executes required processes such as writing the image data of the recording information D1 to an image buffer, and controls the recording mechanism 24 to record the recording information D1 on the recording surface 14a of the label block 14 (step SA17).

A baggage tag is thus produced with the write data D2 (including flight information and current date and time information) written to the RFID tag 11, and the recording information D1 (customer information, flight information, barcode information) recorded on the recording surface.

As described above, when writing write data D2 including tag ID information that is uniquely assigned to each RFID tag 11 is completed normally in the media processing system 1 according to this embodiment of the invention, the system controller 35 of the control unit 20 of a media processing device 2 communicates with the host computer 3, and cumulatively stores tag ID information read from the RFID tag 11 as information identifying the successfully written RFID tag 11 in the written tag ID database 6 of the server-side storage unit 7 of the host computer 3 and the memory unit 30. When writing write data to the RFID tag 11 of a label block 14, the system controller 35 reads the tag ID information from the RFID tag 11 that is communicating with the system controller 35, then communicates with the host computer 3 and determines if tag ID information identical to the tag ID information that was read is contained in the past tag ID information cumulatively stored in the written tag ID database 6 of the host computer 3 or the memory unit 30, and prohibits writing the write data D2 if the same tag ID information is found.

Mistakenly overwriting information that was correctly written to the RFID tag 11 of a label block 14 that can communicate wirelessly with the system controller 35 but is not intended for processing, resulting in the RFID tag 11 storing the wrong information, can therefore be prevented. In addition, all media processing devices 2 in the media processing system 1 can be effectively prevented from overwriting information that was correctly written to the RFID tag 11 of a label block 14 that is not intended for processing.

When writing write data D2 to the RFID tag 11 of a label block 14, the system controller 35 of the control unit 20 of the media processing device 2 in this embodiment communicates with the host computer 3, determines if tag ID information identical to the tag ID information read from the RFID tag 11 is included in the tag ID information cumulatively stored in the written tag ID database 6 of the server-side storage unit 7 of the host computer 3 or the memory unit 30, and if tag ID information identical to the read tag ID information is not included in the cumulatively stored tag ID information and information was already written to the RFID tag 11, records information indicating the same on the label block 14.

By recording this information on the media in this situation, the user can know that information may not have been written correctly to the RFID tag 11 of the label block 14 or that a malfunction occurred, and can take appropriate action.

In step SA5 of the embodiment described above, the recording controller 38 could print VOID or an error message with the recording mechanism 24 on the label block 14 intended for processing. The user can therefore be informed that because writing to the label block 14 having the RFID tag 11 that is communicating and is about to be written has already been successfully completed, further writing and recording of information was prohibited and not done, and data was not written to the RFID tag 11 of the printed label block 14.

As described above, when a label block 14 that was already processed normally and has a RFID tag 11 with the same tag ID as the label block 14 intended for processing has not yet been discharged from the media processing device 2, the recording controller 38 can reverse the label block 14 that was already processed to the recording mechanism 24 with the conveyance mechanism 26, and print VOID or an error thereon.

VOID or an error message can also be printed on at least one of plural label blocks 14 each having an RFID tag 11 storing the same tag ID information.

This embodiment of the invention is simply one possible embodiment, and can obviously be changed and adapted in many ways without departing from the scope of the accompanying claims.

For example, the tag ID information of the RFID tag 11 containing the write data D2 is managed in a written tag ID database 6 on the management server 5 in the embodiment described above, but the invention is not so limited. More specifically, as described above, a configuration in which each media processing device 2 stores and manages the information in its own memory unit 30 is conceivable, and a configuration in which the information is stored and managed on the memory unit 30 of one media processing device 2 in a group of plural media processing devices 2 is also conceivable. A configuration in which each media processing device 2 stores and manages in its own memory unit 30 the tag ID information of the RFID tags 11 to which write data D2 was written is particularly useful when the special paper 10 is processed by a single media processing device 2.

Processes including accessing the written tag ID database 6 on the management server 5, and comparing tag ID information, are handled primarily by the media processing device 2 in cooperation with the management server 5 in the embodiment described above, but part or all of these processes could be handled primarily by the host computer 3 in cooperation with the media processing device 2 and management server 5.

In this implementation, the host computer 3 and media processing device 2 work together to function as a "media processing device."

In addition, the recording head 25 of the media processing device 2 in this embodiment is a thermal head, but the recording method is not so limited and an inkjet head, dot impact head, or other recording method could be used. Any desired communication standard can also be used for communication with the IC tag of the medium.

The function blocks shown in FIG. 3 and FIG. 4 can be achieved in many ways through the cooperation of software and hardware, and do not suggest a specific hardware configuration. The functions of individual function blocks of the media processing device 2 can also be offloaded to a separate device externally connected to the media processing device 2. The media processing device 2 can also execute the operations described above by reading and running a program stored on an externally connected storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
    a conveyor configured to convey a continuous medium having a plurality of label blocks, each of the plurality of label blocks having an IC tags;
    a data reader/writer that writes and reads information including identification information in each of the plurality of IC tags embedded in the continuous medium by wireless communication, the data reader/writer communicating with each of the plurality of IC tags by near-field communication;
    a recording mechanism including a recording head configured to record on the plurality of label blocks;
    a memory that stores at least the identification information written to the plurality of IC tags by the data reader/writer and that stores first recording information; and
    a control circuit that controls the data reader/writer and the memory,
    the control circuit being configured to
        store at least the identification information in the memory after writing the information to a first one of the plurality of IC tags by the data reader/writer ends,
        determine, before writing the information to the first one of the plurality of IC tags by the data reader/writer, whether the identification information read by the data reader/writer from the first one of the plurality of IC tags matches stored identification information stored in the memory, and
        if the identification information read from the first one of the plurality of IC tags matches the stored identification information stored in the memory, reverse the continuous medium with the conveyor, and record, by the recording head, the first recording information on one of the plurality of label blocks that has a second one of the plurality of IC tags having the stored identification information.

2. The media processing device described in claim 1, wherein:
    if the identification information read from the first one of the plurality of IC tags does not match the stored identification information stored in the memory, and other information is already written in the first one of the plurality of IC tags, read the first recording information from the memory, and record the first recording information, by the recording head, on one of the plurality of the label blocks including the first one of the plurality of IC tags.

3. The media processing device described in claim 1, wherein:
the control circuit is configured to determine, before writing the information to the first one of the plurality of IC tags by the data reader/writer, whether a specific default value is written, or the identification information is written by the data reader/writer, in the first one of the plurality of IC tags; and
if the identification information is not written, or the specific default value is written, in the first one of the plurality of IC tags, write the information to the first one of the plurality of IC tags by the data reader/writer.

4. The media processing device described in claim 1, wherein the control circuit is configured to control the recording mechanism to record at least the identification information on one of the plurality of the label blocks including the first one of the plurality of IC tags when the identification information is not written, or the specific default value is written, in the first one of the plurality of IC tags.

5. A media processing system comprising:
a plurality of media processing devices; and
a control device connected to the plurality of media processing devices;
wherein each of the plurality of media processing device includes:
a conveyor configured to convey a continuous medium having a plurality of label blocks, each of the plurality of label blocks having an IC tag,
a data reader/writer that writes and reads information including identification information in the plurality of IC tags embedded in the continuous medium by wireless communication, the data reader/writer communicating with each of the plurality of IC tags by near-field communication,
a recording mechanism including a recording head configured to record on the plurality of label blocks,
a memory that stores at least the identification information written to the plurality of IC tags by the data reader/writer and that stores first recording information, and
a control circuit that controls the data reader/writer and the memory of the control device, the control circuit being configured to
store at least the identification information in the memory of the control device after writing the information to a first one of the plurality of IC tags by the data reader/writer ends,
determine whether the identification information read by the data reader/writer from the first one of the plurality of IC tags matches stored identification information stored in the memory of the control device before writing the information to the first one of the plurality of IC tags by the data reader/writer,
if the identification information read from the first one of the plurality of IC tags matches identification information stored in the memory, reverse the continuous medium with the conveyor, and record, by the recording head, the first recording information on one of the plurality of label blocks that has a second one of the plurality of IC tags having the stored identification information.

6. The media processing system described in claim 5, wherein:
if the identification information read from the first one of the plurality of IC tags does not match the stored identification information stored in the memory, and other information is already written in the first one of the plurality of IC tags, read the specific recording information from the memory, and record the specific recording information, by the recording head, on one of the plurality of the label blocks including the first one of the plurality of IC tags.

7. A control method of a media processing device including a conveyor configured to convey a continuous medium having a plurality of label blocks, each of the plurality of label blocks having an IC tag, a data reader/writer that writes and reads information including identification information in the plurality of IC tags embedded in the continuous medium by wireless communication, a recording mechanism including a recording head configured to record on the plurality of label blocks, and a memory that stores at least the identification information written to the plurality of IC tags by the data reader/writer and that stores first recording information, the control method comprising:
storing at least the identification information in the memory after writing the information to a first one of the plurality of IC tags by the data reader/writer ends, the data reader/writer communicating with the one of the plurality of IC tags by near-field communication;
determining whether the identification information read by the data reader/writer from the first one of the plurality of IC tags matches stored identification information stored in the memory before writing the information to the first one of the plurality of IC tags by the data reader/writer, the data reader/writer communicating with the first one of the plurality of IC tags by near-field communication; and
if the identification information read from the first one of the plurality of IC tags matches the stored identification information stored in the memory, reversing the continuous medium with the conveyor, and recording, by the recording head, the first recording information on one of the plurality of label blocks that has a second one of the plurality of IC tags having the stored identification information.

8. The control method of a media processing device described in claim 7, wherein:
if the identification information read from the first one of the plurality of IC tags does not match the stored identification information stored in the memory, and other information is already written in the first one of the plurality of IC tags, reading the first recording information from the memory, and recording the first recording information, by the recording head, on one of the plurality of the label blocks including the first one of the plurality of IC tags.

9. The control method of a media processing device described in claim 7, the control method further comprising:
determining, before writing the information to the first one of the plurality of IC tags by the data reader/writer, whether a specific default value is written, or the identification information is written by the data reader/writer, in the first one of the plurality of IC tags; and
if the identification information is not written, or the specific default value is written, in the first one of the plurality of IC tags, writing the information to the first one of the plurality of IC tags that can communicate wirelessly by the data reader/writer.

10. The control method of a media processing device described in claim 9, the control method further comprising:
recording at least the identification information on the label block of the continuous medium by the recording head if the identification information is not written, or the specific default value is written, in the first one of the plurality of IC tags.

* * * * *